US008240878B2

(12) United States Patent
Chen

(10) Patent No.: US 8,240,878 B2
(45) Date of Patent: Aug. 14, 2012

(54) WATERPROOF LED DIFFUSER

(75) Inventor: Yi-Qun Chen, Taichung (TW)

(73) Assignee: Safety Traffic Equipment Co., Ltd., Taichung (TW)

( * ) Notice: Subject to any disclaimer, the term of this patent is extended or adjusted under 35 U.S.C. 154(b) by 228 days.

(21) Appl. No.: 12/860,452

(22) Filed: Aug. 20, 2010

(65) Prior Publication Data
US 2012/0044677 A1    Feb. 23, 2012

(51) Int. Cl.
*F21V 1/00* (2006.01)

(52) U.S. Cl. .............. 362/235; 362/311.01; 362/311.02; 362/246; 362/355

(58) Field of Classification Search ............. 362/311.01, 362/311.02, 311.04, 311.05, 235, 246, 249.02, 362/249.04, 355
See application file for complete search history.

(56) References Cited

U.S. PATENT DOCUMENTS

| 5,463,502 A | * | 10/1995 | Savage, Jr. | 359/819 |
| 5,504,660 A | * | 4/1996 | Heidorn | 362/27 |
| 7,070,311 B2 | * | 7/2006 | Lee | 362/545 |
| 2010/0039810 A1 | * | 2/2010 | Holder et al. | 362/235 |

* cited by examiner

Primary Examiner — Evan Dzierzynski
(74) Attorney, Agent, or Firm — Egbert Law Offices PLLC

(57) ABSTRACT

An LED waterproof diffuser has an LED substrate housing, a diffusing portion and an embedded locating portion. The housing is of a 3D holding space formed by an end wall and a periphery. An LED inlet is formed at the other end of the periphery. The hollow diffusing portion is protruded from the center of the end wall of the LED substrate housing in a reducing pattern. The embedded locating portion is formed externally onto the diffusing portion, and can also be embedded securely into the hole of an existing shell plate. The diffuser allows one to assemble a single or several LED units, thus reducing the manufacturing cost and realizing excellent waterproofing effects, while enabling partial replacement or maintenance of LED elements. Moreover, since the outer diameter of the diffusing portion is smaller than that of the LED substrate housing, a smaller hole area for assembly can be obtained.

11 Claims, 10 Drawing Sheets

WATERPROOF LED DIFFUSER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an LED fitting, and more particularly to an innovative one having a waterproof diffuser.

2. Description of Related Art Including Information Disclosed Under 37 CFR 1.97 and 37 CFR 1.98.

LED is extensively applied to light-emitting products such as: ordinary lamps, projection lamps, traffic lights, traffic marks, advertising boxes, decorative lamps and vehicle lamps.

Despite of existing advantages of LED, many technical problems have to be resolved or improved. For instance, LEDs have to be arranged at interval for the desired light-emitting effect, of which every LED must be linked by an electric circuit or circuit board. In such a case, the linking position of every circuit is vulnerable to moisture, leading to possible short circuit or burning of the LED circuit or circuit board. Hence, waterproofing packaging of circuit structure becomes a big technical concern in view of the safety and service life of LED products.

The waterproofing structure of traditional LED products is generally designed in such a manner that the circuit or circuit board is fully poured and coated with waterproof glue, which, however, requires higher glue consumption and cost as well as longer manufacturing time. As such, some products are not acceptable to the consumers due to higher manufacturing cost and sales price. On the other hand, in the event of LED damage, the maintenance of such waterproof structures is extremely difficult and inconvenient.

Thus, to overcome the aforementioned problems of the prior art, it would be an advancement if the art to provide an improved structure that can significantly improve the efficacy.

Therefore, the inventor has provided the present invention of practicability after deliberate experimentation and evaluation based on years of experience in the production and development of related products.

BRIEF SUMMARY OF THE INVENTION

The enhanced efficacy of the present invention is as follows:

Based on the innovative structural configuration of the present invention wherein "an improved LED waterproof diffuser" mainly comprises an LED substrate housing, a diffusing portion and embedded locating portion, said LED waterproof diffuser of the present invention allows for assembly of a single or a few LED units, and waterproofing is implemented within the LED waterproof diffuser so as to reduce greatly the manufacturing cost and realize excellent waterproofing effect of LED waterproofing structure, while enabling partial replacement or maintenance with better applicability and industrial benefits.

The present invention is characterized in that the embedded locating portion is formed onto the diffusing portion. Since the outer diameter of the diffusing portion is smaller than that of the LED substrate housing, a smaller hole area for assembly can be obtained, thus further minimizing the gap of LED lights and improving the waterproofing effect.

The improvements brought about by this invention are as follows:

Based on the technical characteristics wherein the diffusing portion also includes a light bulge extended from the end wall and the embedded locating portion is located correspondingly to the light bulge, the light spots of the LED can be controlled in tune with different lamps through the configuration of light bulges with varying diameters. This is because the diameter of the light spots of LED prescribed in some national regulations is required to be smaller than that of LED unit in the respective industry, making it possible to further reduce the light spots by cutting down the diameter of the light bulge.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
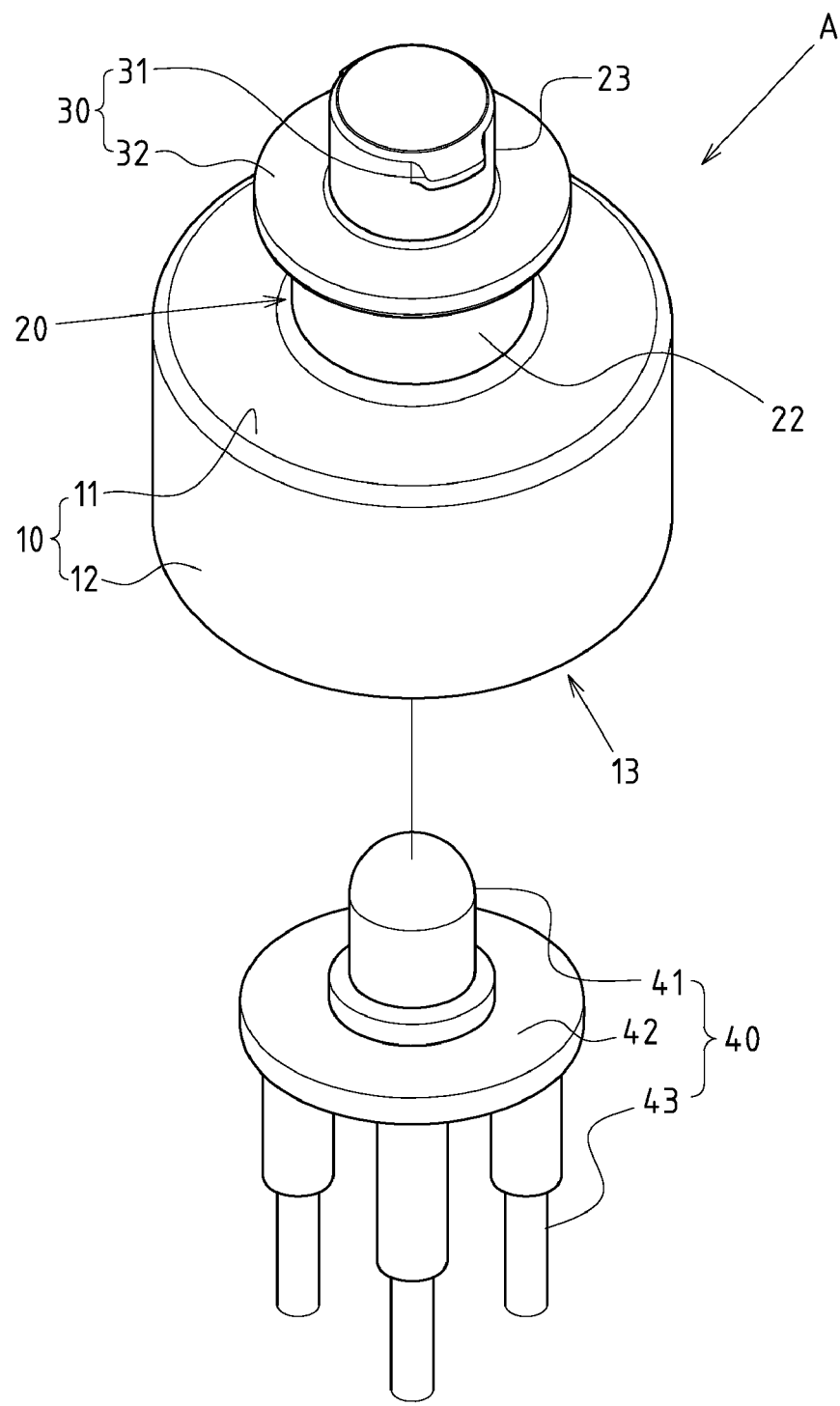
FIG. 1 shows an exploded perspective view showing the assembly relation of the LED waterproof diffuser and LED unit of the present invention.

FIGS. 1-4 depict preferred embodiments of an LED waterproof diffuser of the present invention, which, however, are provided for only explanatory objective for patent claims. Said LED waterproof diffuser A comprises: an LED substrate housing 10, a diffusing portion 20 and an embedded locating portion 30. Of which, the LED substrate housing 10 is of a 3D holding space formed by an end wall 11 and a periphery 12. An LED inlet 13 is formed at the other end of the periphery 12. The hollow diffusing portion 20 of light transmittance is protruded from the center of the end wall 11 of the LED substrate housing 10 in a reducing pattern. The diffusing portion 20 includes an end wall 21 and a peripheral wall 22. The embedded locating portion 30 is formed externally onto the diffusing portion 20, and can also be embedded securely into the hole 06 of the existing shell plate 05 (shown in FIGS. 3, 4).

Figure 2:
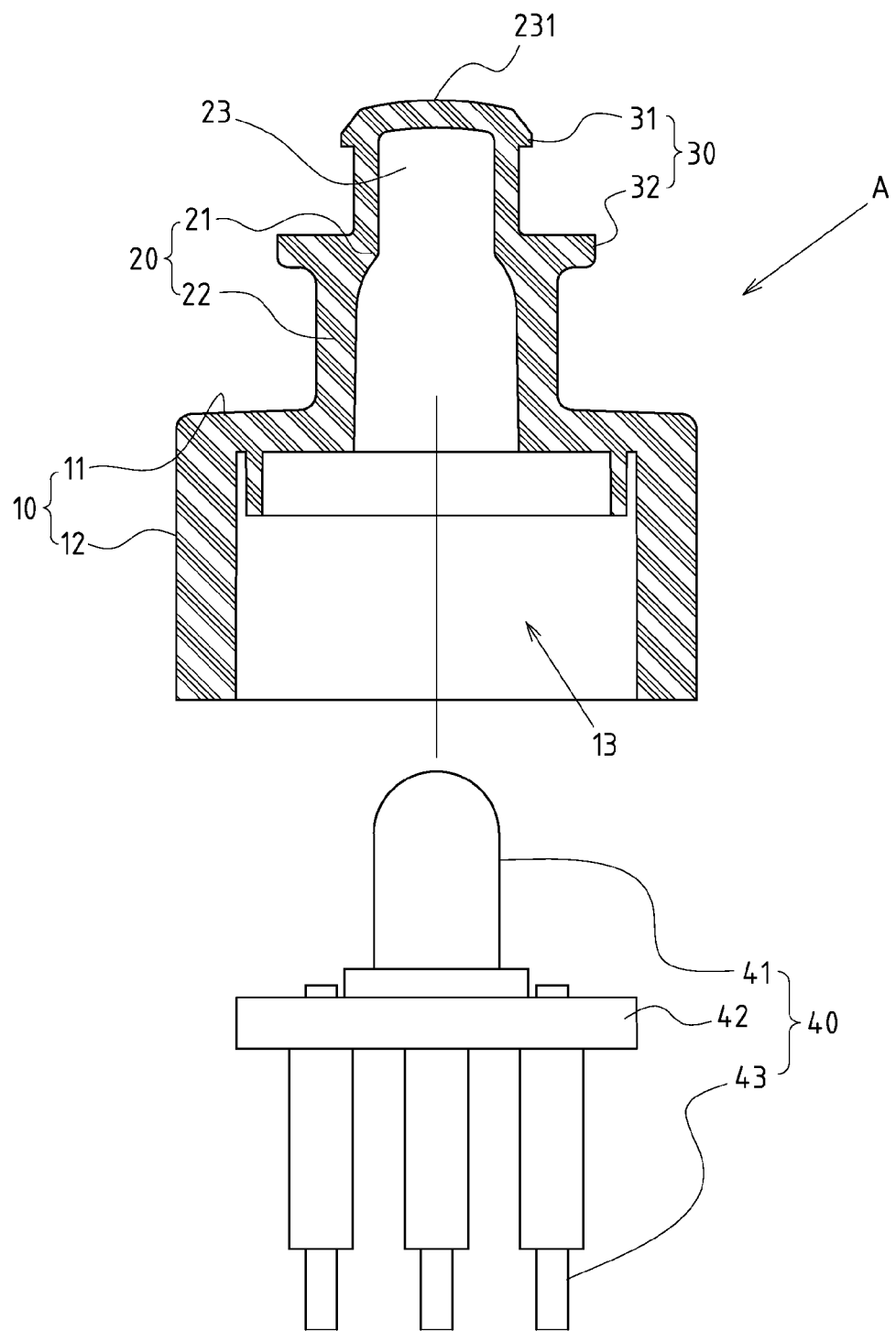
FIG. 2 shows an exploded sectional view showing the assembly relation of the LED waterproof diffuser and LED unit of the present invention. The LED unit is not shown in section.
Figure 3:
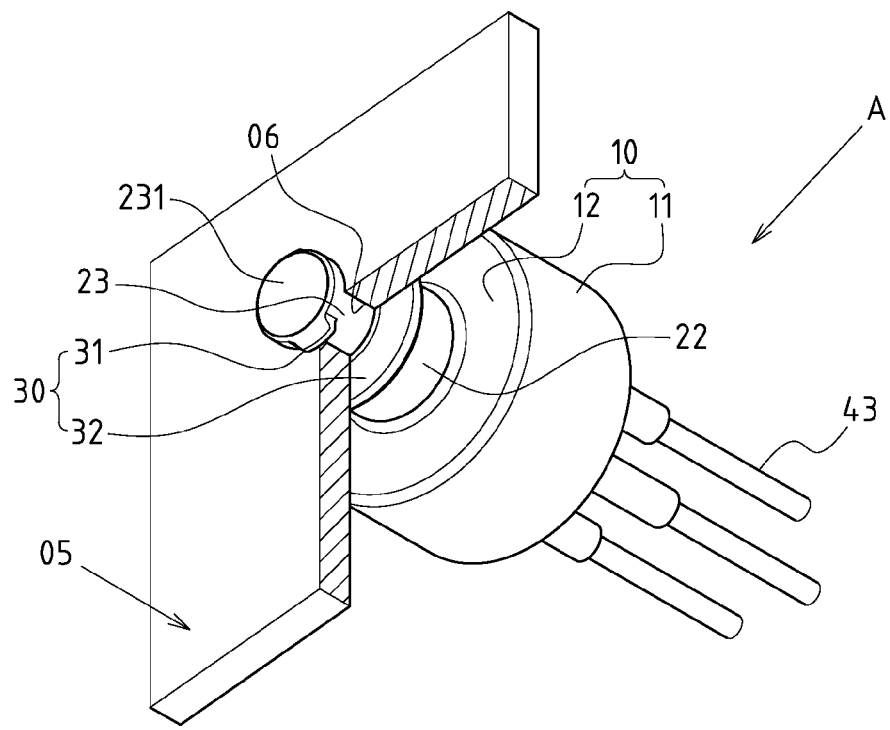
FIG. 3 shows a perspective view of the present invention wherein the LED waterproof diffuser is embedded onto the shell plate.

Referring to FIGS. 1 and 2, the embedded locating portion 30 includes a snapping flange 31 and a stopping flange 32. Of which, the stopping flange 32 is abutted onto the inner surface of the shell plate 05 for limitation (shown in FIG. 4). The snapping flange 31 is snapped into one end of the hole 06 of the shell plate 05 (shown in FIG. 4), or embedded securely into hole 06 of the shell plate 05.

Figure 5:
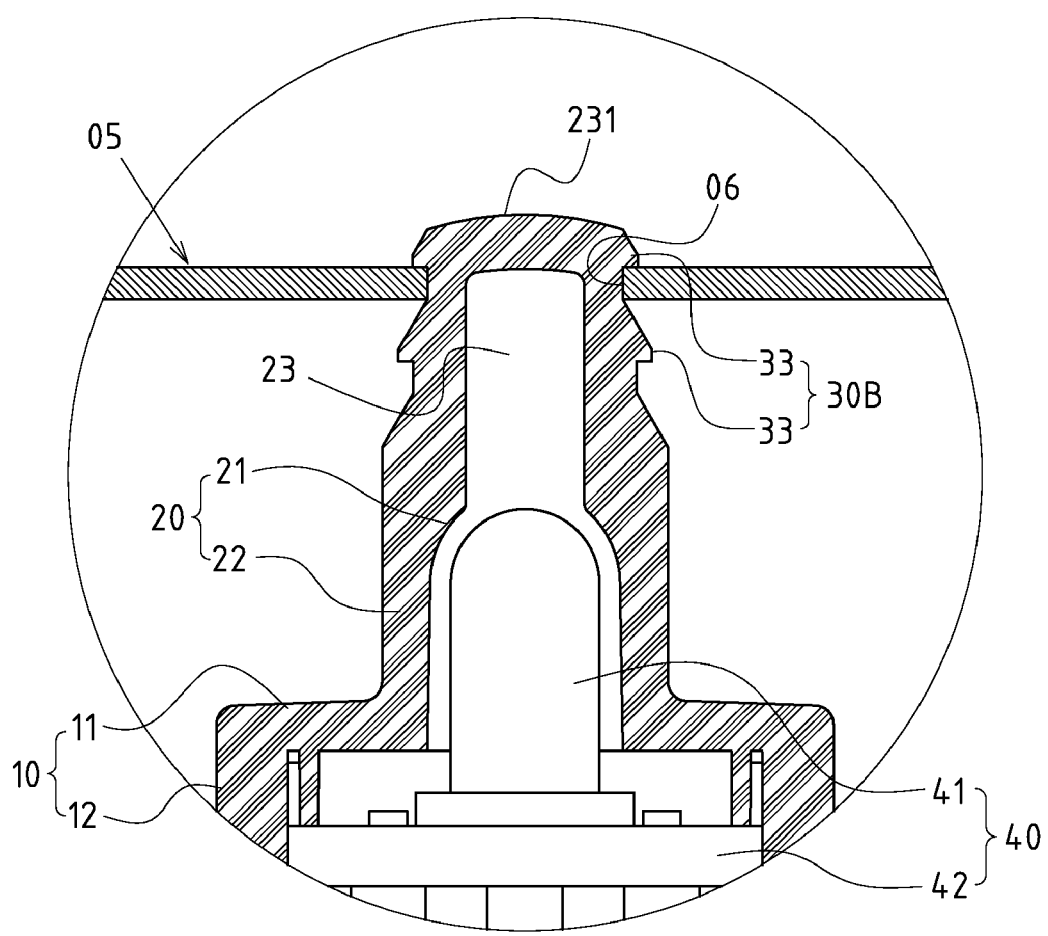
FIG. 5 shows a schematic view of the embedded locating portion of the present invention.

Referring to FIG. 5, the embedded locating portion 30B is provided with a plurality of stepped teeth 33. In this preferred embodiment, the embedded locating portion 30B can be adapted to be assembled robustly in response to the size of hole 06 of the shell plate 05.

Figure 7:
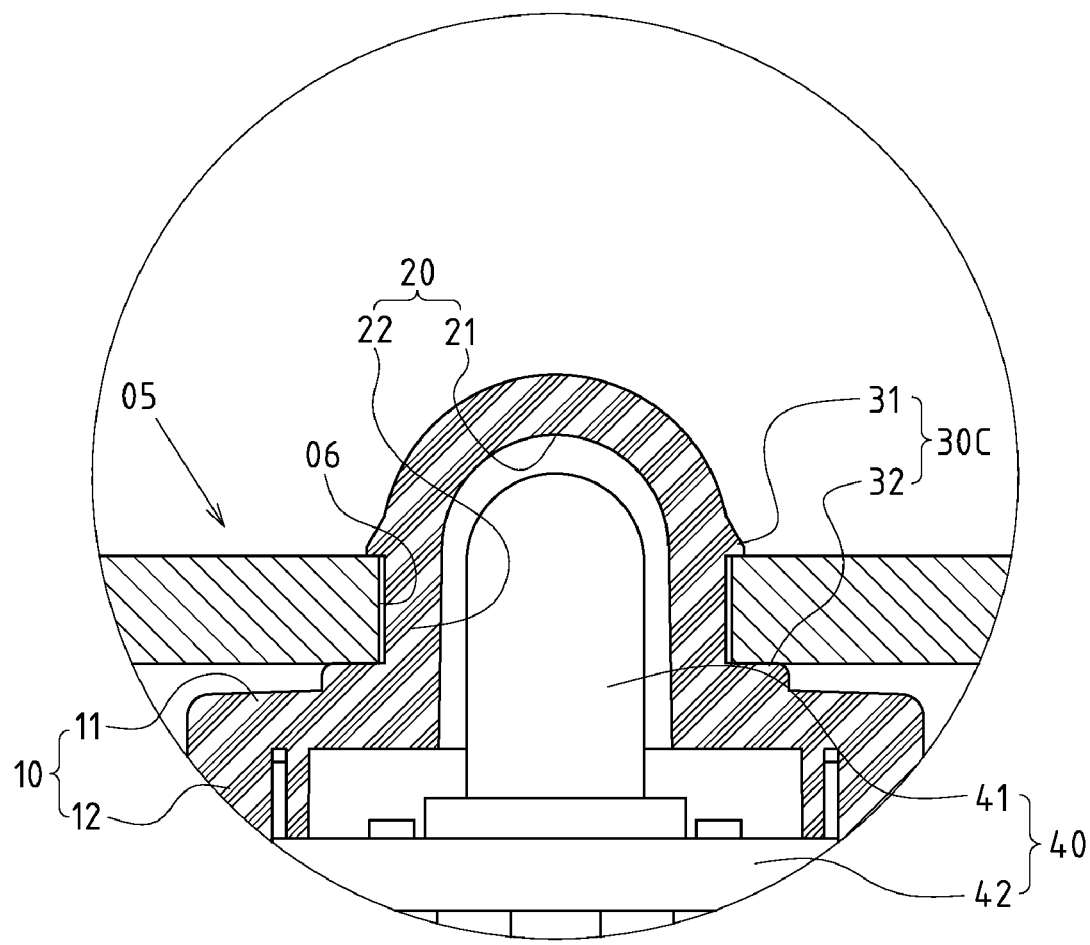
FIG. 7 shows a schematic view of the present invention wherein the embedded locating portion is arranged onto the peripheral wall of the diffusing portion.

Referring also to FIG. 7, the embedded locating portion 30C is arranged externally onto the peripheral wall 22 of the diffusing portion 20.

Figure 8:
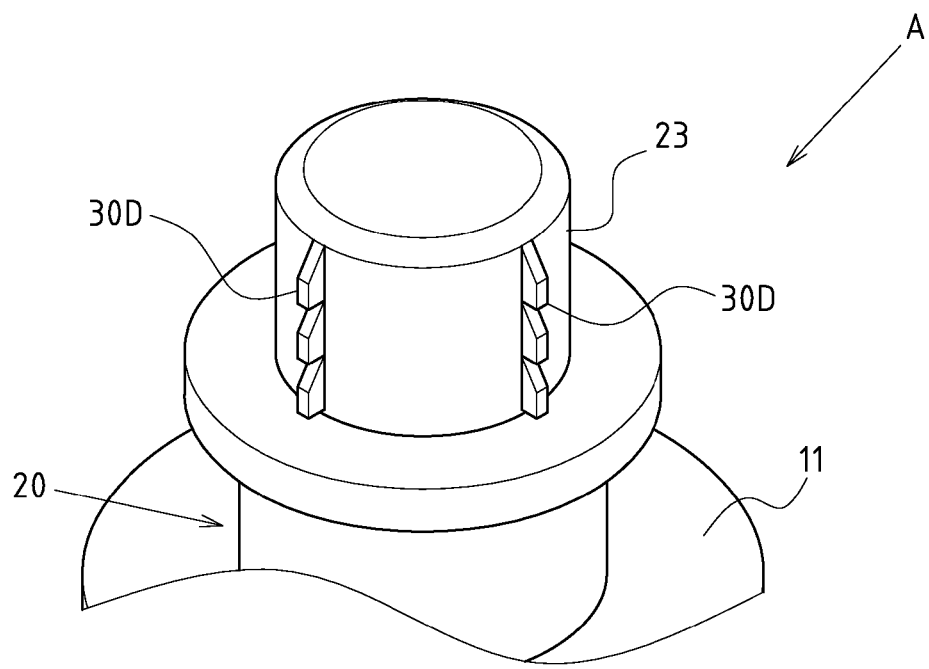
FIG. 8 shows a schematic view of the present invention wherein the embedded locating portion is provided with a frictional positioning flange.

Referring also to FIG. 8, the embedded locating portion 30D is provided with a frictional positioning flange, which is composed of refined lugs, raised teeth or ribs protruded laterally onto the light bulge 23 (or diffusing portion 20), allowing for snapping into the hole of the shell plate through frictional engagement.

Figure 4:
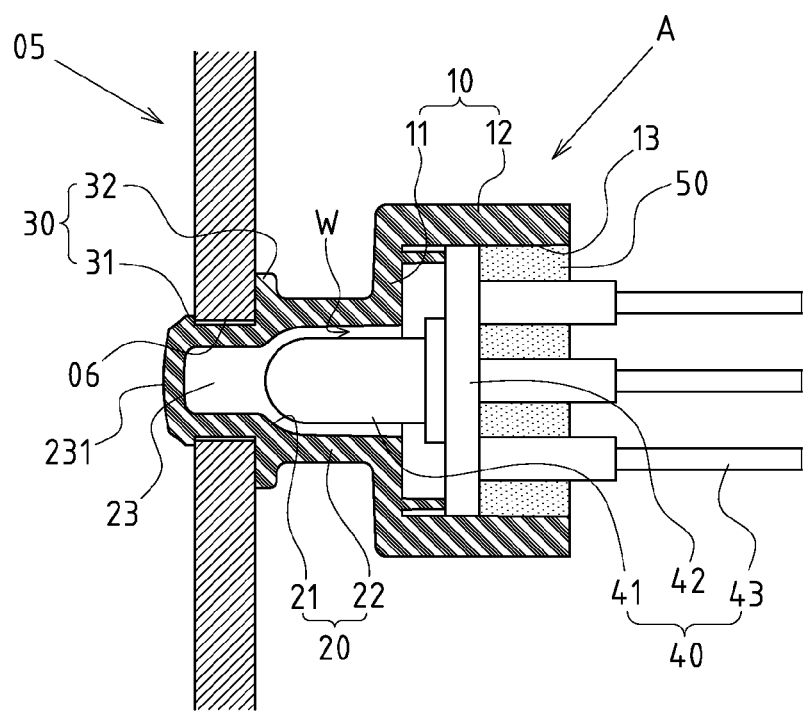
FIG. 4 shows a sectional view of the present invention wherein the LED waterproof diffuser is embedded onto the shell plate.

Referring to FIGS. 1, 2, and 4, the LED waterproof diffuser A is covered externally onto an LED unit 40. The LED unit 40 comprises at least an LED element 41, an LED substrate 42 and an electrical wire 43. The LED substrate housing 10 of the LED waterproof diffuser A is used to accommodate the LED substrate 42 of the LED unit 40. The diffusing portion 20 of the LED waterproof diffuser A is used to accommodate the LED element 41 of the LED unit 40. Moreover, the LED substrate housing 10 is poured with a waterproof agent 50 (only marked in FIG. 4) to seal the LED substrate 42.

Amongst the aforementioned structural pattern, there is a gap between LED element 41 and diffusing portion 20 (marked by W in FIG. 4) as a preferred option. This is because the embedded locating portion 30 of the present invention is arranged externally onto the diffusing portion 20, a gap between LED element 41 and diffusing portion 20 could ensure better elasticity of the embedded locating portion 30. Moreover, this could reduce the probability of damage of LED element 41 under external pressure.

Figure 6:
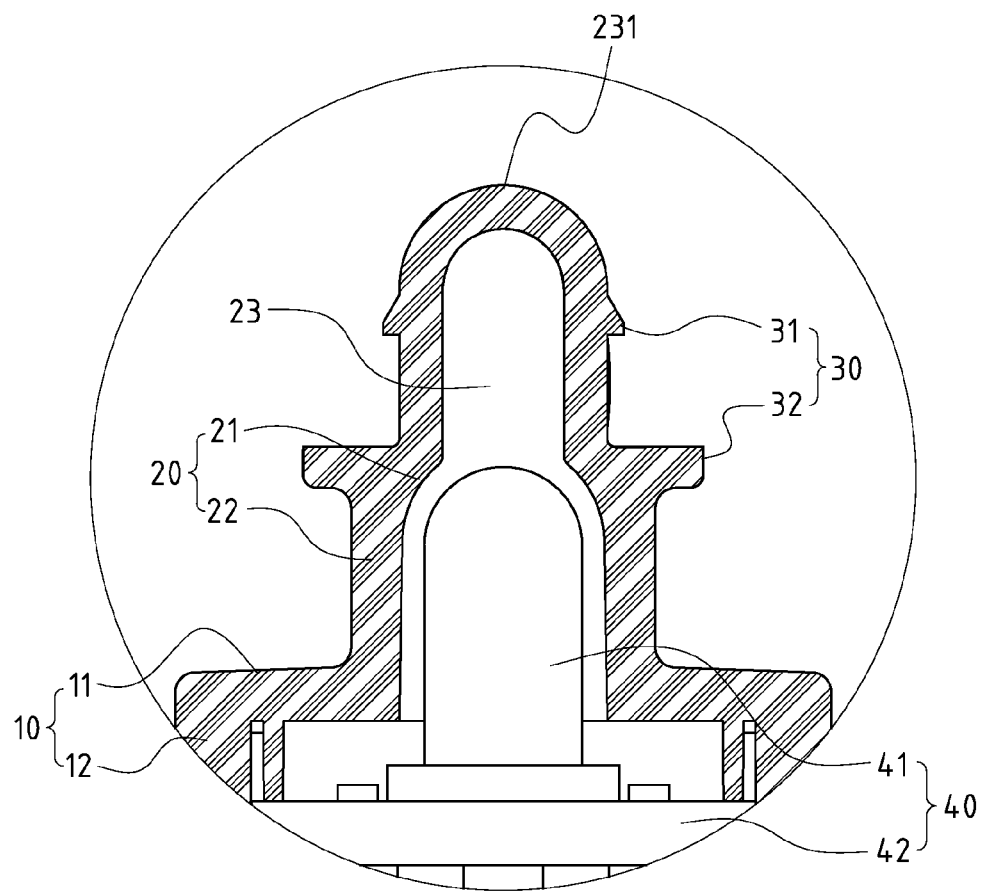
FIG. 6 shows another schematic view of the present invention wherein the end surface of the light bulge is configured into a curved plane.

Referring also to FIGS. 1-4, the present invention is also characterized by that, the diffusing portion 20 includes a light bulge 23 extended from the end wall 21. The embedded locating portion 30 is located correspondingly to the light bulge 23. The end surface 231 of the light bulge 23 is of either a flat surface (shown in FIG. 1), a curved surface (shown in FIG. 6), a tapered surface or a toothed surface. Moreover, the light bulge 23 can be configured into either a solid cylinder or a hollow tube.

Based on above-specified structural configuration, said LED unit 40 of the present invention can be covered onto the LED waterproof diffuser A, so that the exposed LED element 41 can be protected against moisture. Furthermore, the LED substrate 42 along with the electric connection point of the LED substrate 42 and electrical wire 43 can be protected against moisture through the LED substrate housing 10 and waterproof agent 50.

Figure 9:
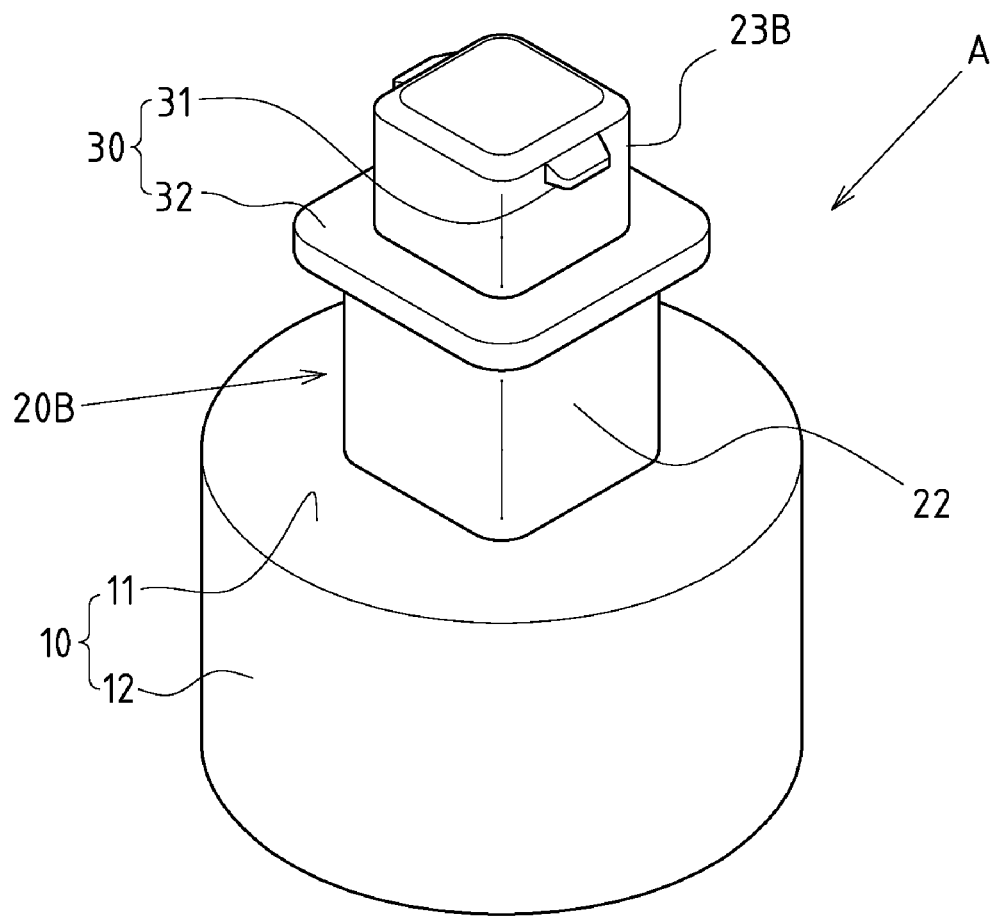
FIG. 9 shows another schematic view showing the radial profile of the diffusing portion and light bulge of the present invention.
Figure 10:
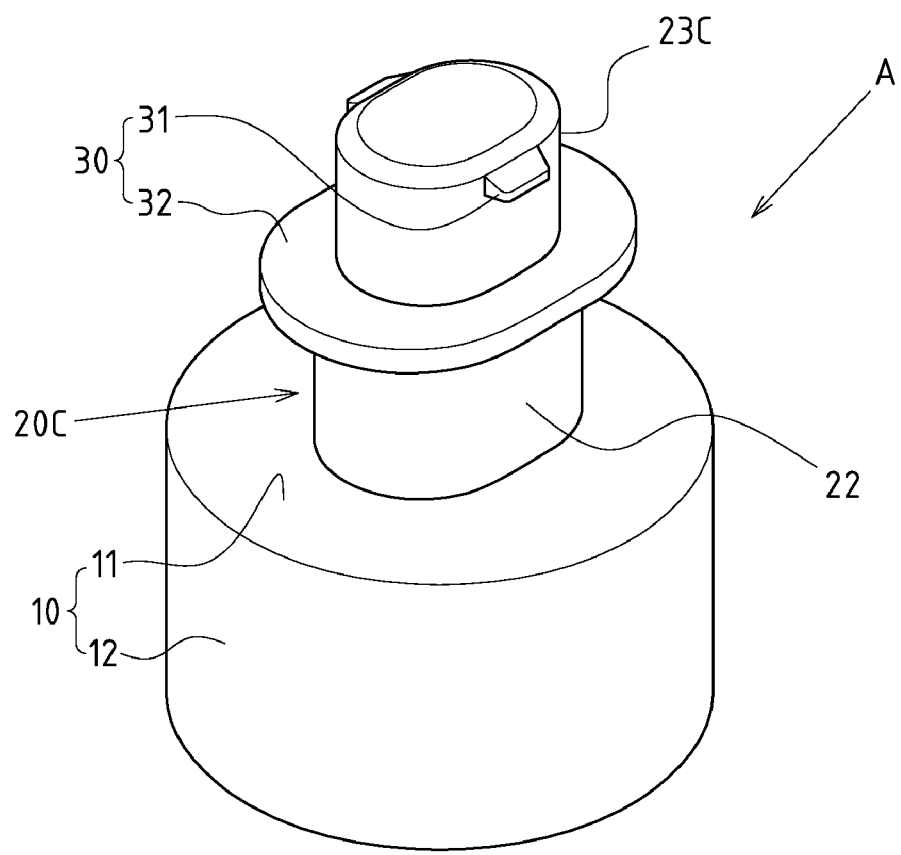
FIG. 10 shows another schematic view showing the radial profile of the diffusing portion and light bulge of the present invention.

The radial profile of the peripheral wall 22 of the diffusing portion 20 and the light bulge 23 is of either a round, elliptical, rectangular, oblong or polygonal shape. Referring to FIG. 1, the radial profile of the diffusing portion 20 and the light bulge 23 is of a round shape. Referring also to FIG. 9, the radial profile of the diffusing portion 20B and the light bulge 23B is of a rectangular shape. Referring also to FIG. 10, the radial profile of the diffusing portion 20C and light bulge 23C is of an oblong shape.

Figure 11:
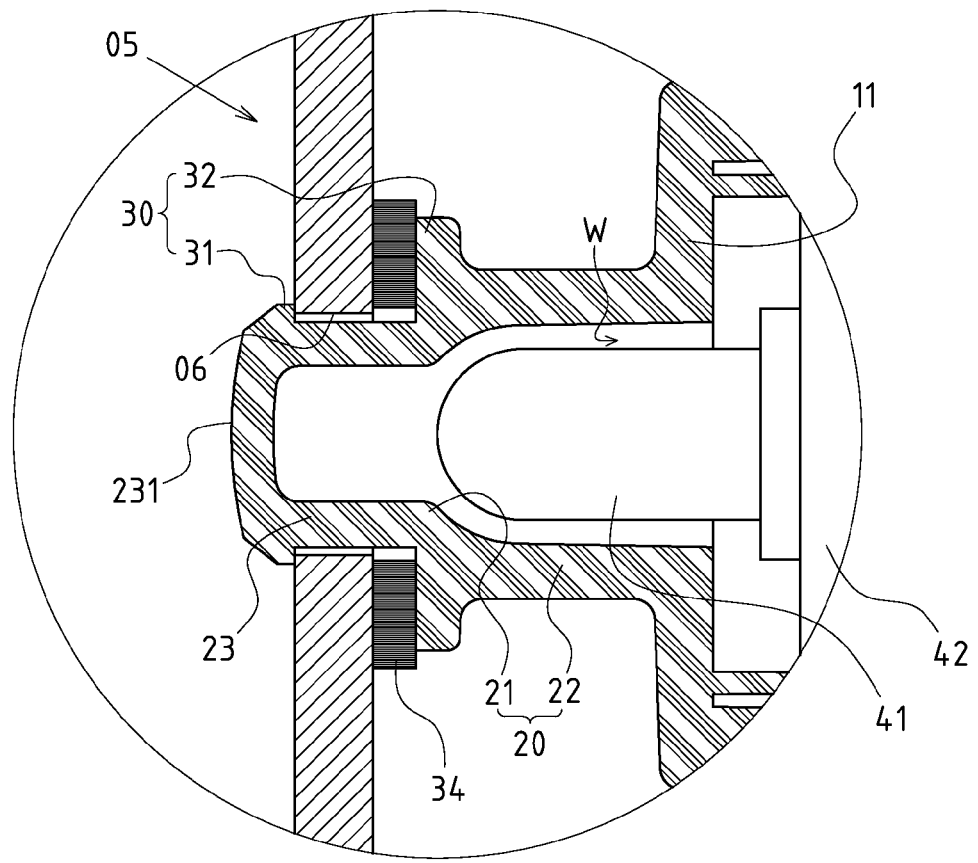
FIG. 11 shows a schematic view of the present invention wherein the embedded locating portion comprises a liner.

Referring also to FIG. 11, the embedded locating portion 30 also comprises a liner 34, which is made of solid or flexible materials in a circular or C-shaped pattern. With the arrangement of the liner 34, compact and robust assembly is made possible in response to the shell plate 05 of different thickness. Referring to FIG. 11, the gap between the snapping flange 31 and stopping flange 32 of embedded locating portion 30 is bigger than the thickness of the shell plate 05. As such, the liner 34 can be filled reliably between the stopping flange 32 and shell plate 05. Said liner 34 is also suitable to the embedded locating portion disclosed in FIGS. 5 and 8.

In the practice, said LED waterproof diffuser A of the present invention can be extensively used for LED units such as: traffic marks, advertisement boxes and decorative shell plates, thereby improving the waterproofing effect and extending effectively the service life of LED light-emitting units.

I claim:

1. An improved LED waterproof diffuser comprising: an LED substrate housing, a diffusing portion and an embedded locating portion; of which, the LED substrate housing is of a 3D holding space formed by an end wall and a periphery; an LED inlet is formed at an other end of the periphery; the hollow diffusing portion is protruded from a center of the end wall of the LED substrate housing in a reducing pattern; the diffusing portion comprises an end wall and a peripheral wall; the embedded locating portion is formed externally onto the diffusing portion, and can also be embedded securely into the hole of an existing shell plate.

2. The structure defined in claim 1, wherein the embedded locating portion comprises a snapping flange and a stopping flange; the embedded locating portion is provided with either stepped teeth or a frictional positioning flange; of which the embedded locating portion also comprises a liner, enabling compact and robust assembly in response to the shell plate of different thickness.

3. The structure defined in claim 1, wherein the LED waterproof diffuser is covered externally onto an LED unit; the LED unit comprises at least an LED element, an LED substrate and an electrical wire; the LED substrate housing of the LED waterproof diffuser is used to accommodate the LED substrate of the LED unit; the diffusing portion of the LED waterproof diffuser is used to accommodate the LED element of the LED unit; moreover, the LED substrate housing is poured with waterproof agent to seal the LED substrate.

4. The structure defined in claim 3, wherein there is a gap between LED element and diffusing portion.

5. The structure defined in claim 1, wherein the radial profile of the peripheral wall of the diffusing portion is of either a round, elliptical, rectangular, oblong or polygonal shape.

6. An improved LED waterproof diffuser comprising: an LED substrate housing, a diffusing portion and an embedded locating portion; of which, the LED substrate housing is of a 3D holding space formed by an end wall and a periphery; an LED inlet is formed at the other end of the periphery; the hollow diffusing portion is protruded from the end wall of the LED substrate housing; the diffusing portion comprises an end wall and a peripheral wall; the embedded locating portion is formed externally onto the diffusing portion, and can also be embedded securely into the hole of existing shell plate; furthermore, the diffusing portion comprises a light bulge extended from the end wall; the light bulge can be configured into either a solid cylinder or a hollow tube, and the embedded locating portion is located correspondingly to the light bulge.

7. The structure defined in claim 6, wherein the embedded locating portion comprises a snapping flange and a stopping flange; the embedded locating portion is provided with either stepped teeth or a frictional positioning flange; of which the embedded locating portion also comprises a liner, enabling compact and robust assembly in response to the shell plate of different thickness.

8. The structure defined in claim 6, wherein the LED waterproof diffuser is covered externally onto an LED unit; the LED unit comprises at least an LED element, an LED substrate and an electrical wire; the LED substrate housing of the LED waterproof diffuser is used to accommodate the LED substrate of the LED unit; the diffusing portion of the LED waterproof diffuser is used to accommodate the LED element of the LED unit; moreover, the LED substrate housing is poured with waterproof agent to seal the LED substrate.

9. The structure defined in claim 8, wherein there is a gap between LED element and diffusing portion.

10. The structure defined in claim 6, wherein the end surface of the diffusing portion is of either a flat surface, curved plane, a tapered surface or a toothed surface.

11. The structure defined in claim 6, wherein the radial profile of the peripheral wall of the diffusing portion and the light bulge is of either a round, elliptical, rectangular, oblong or polygonal shape.

* * * * *